United States Patent
Zubik (10) Patent No.: US 12,363,045 B2
(45) Date of Patent: Jul. 15, 2025

(54) SYSTEMS AND METHODS FOR ADAPTIVE TRAFFIC SHAPING FOR AN IN-VEHICLE NETWORK

(71) Applicant: GM Global Technology Operations LLC, Detroit, MI (US)

(72) Inventor: Joshua Zubik, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 18/470,764

(22) Filed: Sep. 20, 2023

(65) Prior Publication Data

US 2025/0097159 A1 Mar. 20, 2025

(51) Int. Cl.
H04L 47/22 (2022.01)
G07C 5/00 (2006.01)
H04L 47/125 (2022.01)
H04L 47/2425 (2022.01)

(52) U.S. Cl.
CPC ........ *H04L 47/2425* (2013.01); *H04L 47/125* (2013.01); *H04L 47/22* (2013.01); *G07C 5/008* (2013.01)

(58) Field of Classification Search
CPC ... H04L 47/2425; H04L 47/125; H04L 47/22; G07C 5/008; G07C 5/085; G08G 1/0112; G08G 1/0125; G08G 1/0133
See application file for complete search history.

(56) References Cited

U.S. PATENT DOCUMENTS

| | | | | |
|---|---|---|---|---|
| 10,805,810 | B2 * | 10/2020 | Kotecha | H04W 28/02 |
| 2013/0077486 | A1 * | 3/2013 | Keith | H04L 47/2433 |
| | | | | 370/230.1 |
| 2019/0140933 | A1 * | 5/2019 | Guim Bernat | H04L 41/5006 |
| 2020/0382440 | A1 * | 12/2020 | Hoh | G08G 1/0129 |
| 2022/0353732 | A1 * | 11/2022 | Filippou | H04W 28/0289 |
| 2024/0163175 | A1 * | 5/2024 | Shimezawa | G08G 1/096725 |
| 2024/0331532 | A1 * | 10/2024 | Farid | G08G 1/0112 |
| 2025/0076075 | A1 * | 3/2025 | Enapakurthi | G01C 21/3819 |
| 2025/0140040 | A1 * | 5/2025 | Ramnani | G07C 5/085 |

* cited by examiner

*Primary Examiner* — Jason D Cardone
(74) *Attorney, Agent, or Firm* — Vivacqua Crane, PLLC (57) ABSTRACT

Systems, methods, and devices for network adaptive traffic shaping are described. The system includes a communication data network and a network device. The communication data network is configured to transmit data in the form of data packets. The network device is in communication with the communication data network for controlling the data packets travelling on the communication data network. Moreover, the network device is configured to execute program code to carry out the following operations: monitor data traffic metrics of the data packets travelling on the communication data network, compare the data traffic metrics to data network requirements, determine whether the data traffic metrics is different than the data network requirements, and adjusting a data traffic shaper based on the determination that the traffic metrics is different than the data network requirements.

8 Claims, 4 Drawing Sheets

SYSTEMS AND METHODS FOR ADAPTIVE TRAFFIC SHAPING FOR AN IN-VEHICLE NETWORK

INTRODUCTION

The disclosure relates to the field of vehicle networking and, more specifically, to systems and methods for traffic shaping of network traffic on an in-vehicle network.

As technology advances, vehicles include an increasing number of components that communicate messages using, for example, serial data traffic within one or more controller area networks. The components send and/or receive messages with different categories or priorities to the network. Further, these messages may be sent by the components at times and in quantities that are non-uniform or unpredictable based on various operational modes or conditions of the vehicle and components thereof. Thus, the amount of network traffic is highly variable and dynamically changes during vehicle operation.

Network switches may include traffic shapers that may delay forwarding of messages or drop them entirely during times of network congestion. The traffic shaper may promote transmission of higher-priority data categories while demoting transmission of lower-priority data categories when congestion prevents the switch from forwarding all received data in an attempt to mitigate effects on vehicle performance. While conventional traffic shapers achieve their intended purpose, a need exists to address the constantly changing data modes and resulting priorities for data traveling on in-vehicle network.

SUMMARY

Packet loss or delay of even "low priority" categories may adversely affect performance of the vehicle or components thereof. Further, data categories that are considered "higher priority" and those that are considered "lower priority" may change based on myriad combinations of vehicle operational modes, conditions, and age. For example, adding, changing, and/or replacing components of the vehicle may change optimal traffic shaping configurations. Similarly, updates to software, instructions, or controls for vehicle components may change optimal traffic shaping configurations.

Accordingly, a communication system with a network adaptive traffic shaper is provided. The network adaptive traffic shaper changes over time to meet changing needs of the communication system based at least in part on network traffic conditions that occurred during prior vehicle operations. The network adaptive traffic shaper may automatically change without direct intervention (e.g., without software updates), and may continually optimize compliance with service requirements for each of the message categories.

The network adaptive traffic shaper may also extend the lifespan of the communication system and/or mitigate adverse effects of unexpected occurrences within the communication system.

In accordance with an aspect of the present disclosure, a vehicle is provided having a communication data network, a plurality of electronic control units, a plurality of sensors and a network device. The communication data network transmits a plurality of data. The data is in the form of a plurality of data packets. The plurality of electronic control units (ECUs) is in communication with the communication data network for transmitting the plurality of data packets to and receiving the plurality of data packets from the communication data network. The plurality of sensors is in electrical communication with the ECUs and each provide a sensor signal to the ECUs. The network device is in communication with the communication data network for controlling the plurality of data packets travelling on the communication data network. The network device is configured to execute program code to carry out the following operations: monitor a plurality of data traffic metrics of the plurality of data packets on the communication data network, compare the plurality of data traffic metrics to a plurality of data network requirements, determine whether the plurality of data traffic metrics is different than the plurality of data network requirements, and adjusting a data traffic shaper based on the determination that the plurality of traffic metrics is different than the plurality of data network requirements.

In accordance with another aspect of the present disclosure, the network switch has a plurality of states that are adjustable by the data traffic shaper to control the data traffic on the communication data network.

In accordance with another aspect of the present disclosure, the network switch has a first operational mode defined by a first plurality of the plurality of states.

In accordance with another aspect of the present disclosure, the network switch has a second operational mode defined by a second plurality of the plurality of states of the network switch.

In accordance with another aspect of the present disclosure, the network switch has a third operational mode defined by a third plurality of the plurality of states of the network switch.

In accordance with another aspect of the present disclosure, adjusting the data traffic shaper further includes placing the network switch in the first operational mode based at least in part on a class of the plurality of data packets.

In accordance with another aspect of the present disclosure, adjusting the data traffic shaper further includes placing the network switch in the second operational mode based at least in part on the plurality of data packets originating from a first plurality of the plurality of sensors.

In accordance with another aspect of the present disclosure, adjusting the data traffic shaper further includes placing the network switch in the third operational mode based at least in part on a data packet density of the plurality of data packets.

In accordance with another aspect of the present disclosure, the data traffic shaper further includes a reinforcement learning algorithm to determine the first plurality of the plurality of states that define the first operational mode, the second plurality of the plurality of states that define the second operational mode and the third plurality of the plurality of states that define the third operational mode.

In accordance with yet another aspect of the present disclosure, a system is provided having a communication data network and a network device. The communication data network is configured to transmit a plurality of data. The plurality of data includes a plurality of data packets. The network device is in communication with the communication data network for controlling the plurality of data packets travelling on the communication data network. The network device is configured to execute program code to carry out the following operations: monitor a plurality of data traffic metrics of the plurality of data packets travelling on the communication data network, compare the plurality of data traffic metrics to a plurality of data network requirements, determine whether the plurality of data traffic metrics is different than the plurality of data network requirements, and adjusting a data traffic shaper based on the determination that the plurality of traffic metrics is different than the plurality of data network requirements.

In accordance with yet another aspect of the present disclosure, the network device is a network switch that has a plurality of states that are adjustable by the data traffic shaper to control the data traffic on the communication data network.

In accordance with yet another aspect of the present disclosure, the network switch has a first operational mode defined by a first plurality of the plurality of states.

In accordance with yet another aspect of the present disclosure, the network switch has a second operational mode defined by a second plurality of the plurality of states of the network switch.

In accordance with yet another aspect of the present disclosure, the network switch has a third operational mode defined by a third plurality of the plurality of states of the network switch.

In accordance with yet another aspect of the present disclosure, adjusting the data traffic shaper further includes placing the network switch in the first operational mode based at least in part on a class of the plurality of data packets.

In accordance with yet another aspect of the present disclosure, adjusting the data traffic shaper further includes placing the network switch in the second operational mode based at least in part on the plurality of data packets originating from a first plurality of the plurality of sensors.

In accordance with yet another aspect of the present disclosure, adjusting the data traffic shaper further includes placing the network switch to the third operational mode based at least in part on a data packet density of the plurality of data packets.

In accordance with yet another aspect of the present disclosure, the data traffic shaper further includes a reinforcement learning algorithm to determine the first plurality of the plurality of states that define the first operational mode, the second plurality of the plurality of states that define the second operational mode and the third plurality of the plurality of states that define the third operational mode.

In accordance with still another aspect of the present disclosure, a method is provided. The method includes transmitting a plurality of data on a communication data network, where the plurality of data includes a plurality of data packets, controlling the plurality of data packets travelling on the communication data network using a network device in communication with the communication data network. The network device has a plurality of states and is configured to execute program code to carry out the following operations: monitor a plurality of data traffic metrics of the plurality of data packets travelling on the communication data network, compare the plurality of data traffic metrics to a plurality of data network requirements, determine whether the plurality of data traffic metrics is different than the plurality of data network requirements, and adjusting a data traffic shaper based on the determination that the plurality of traffic metrics is different than the plurality of data network requirements.

In accordance with still another aspect of the present disclosure, adjusting the data traffic shaper further includes changing the plurality of states of the network device in response to determining that the plurality of data traffic metrics is different than the plurality of data network requirements.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
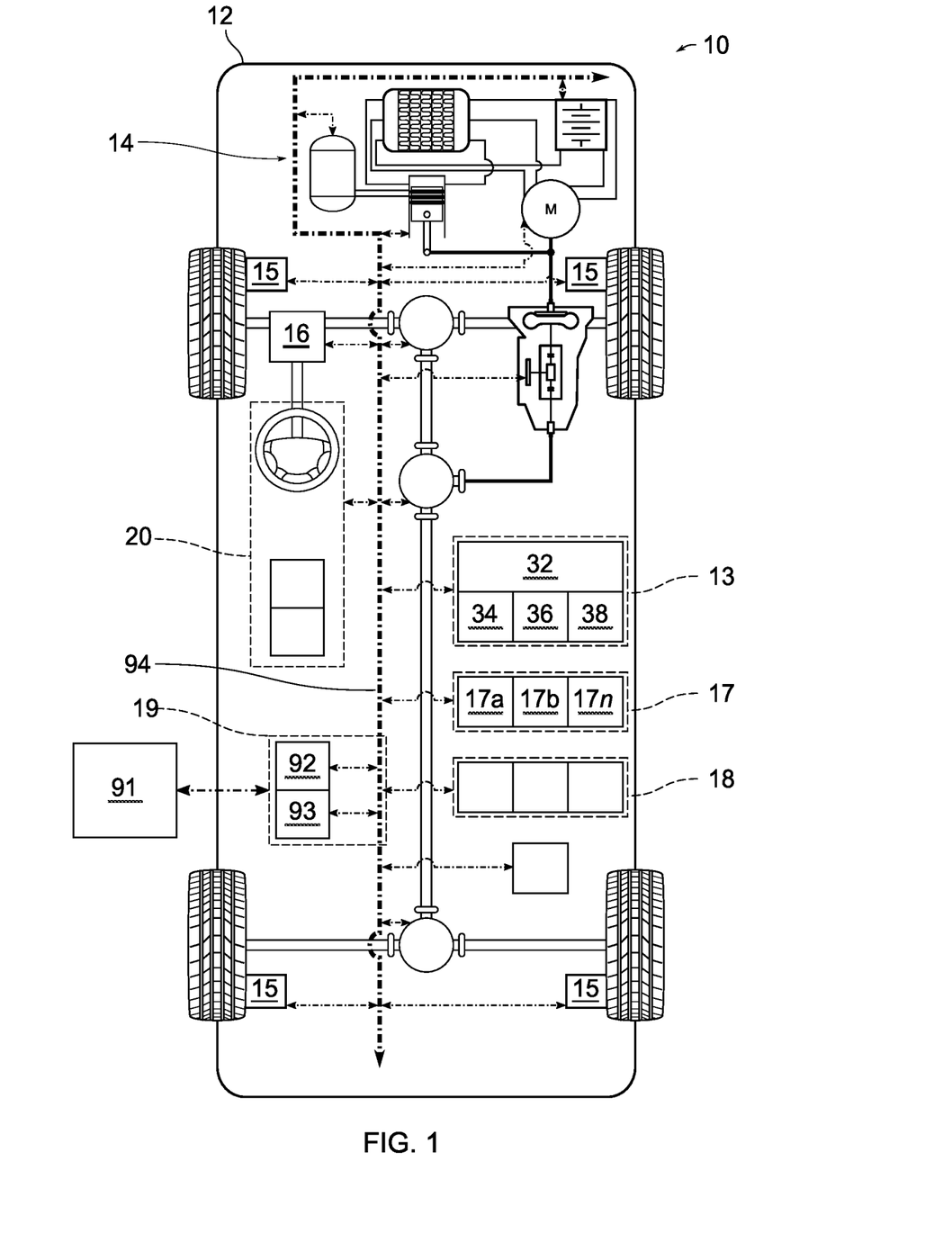
FIG. 1 is a schematic of a vehicle, in accordance with aspects of the present disclosure.

FIG. 1 illustrates vehicle 10 according to aspects of the present disclosure. The vehicle 10 generally includes a body 12, a vehicle-control system 13, a powerplant 14, a braking system 15, a steering system 16, a sensor system 17, an actuator system 18, a communication network 19, and one or more human-machine interfaces 20. The body 12 is arranged on a chassis and substantially encloses components of the vehicle 10. The body 12 and the chassis may jointly form a frame.

The control system 13 is configured to control at least one vehicle function via receiving, processing, and sending signals between vehicle components. The vehicle-control system 13 includes a controller 32 with at least one processor 34, at least one computer-readable storage medium 36, and at least one signal input-output interface 38. The control system 13 is, or may include, one or more powertrain, engine, transmission, braking, steering, and/or suspension control modules, central control modules, and the like. For example, the control system 13 is, or may include, one or more electronic control units (ECU) responsible for controlling one or more of the systems or subsystems of the vehicle 10 (e.g., a "braking ECU" or "braking control unit").

The terms "controller," "control module," "control," "control unit," "processor" and similar terms may mean, as context dictates, Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, other components, combinations thereof, and the like to provide the described functionality. "Software," "firmware," "programs," "instructions," "routines," "code," "algorithms" and similar terms mean controller executable instruction sets including calibrations and look-up tables.

To appropriately control operation of the vehicle 10 and components thereof, e.g., components of the communication network 19, the controller 32 may include a processor (e.g., a microprocessor) and at least one memory, at least some of which is tangible and non-transitory. The memory can store controller-executable instruction sets, and the processor can execute the controller executable instruction sets stored in the memory. The memory may be a recordable medium or recordable media that participate in providing computer-readable data or process instructions.

The recordable medium may take many forms, including but not limited to non-volatile media and volatile media. Non-volatile media for the controller 32 may include, for example, optical or magnetic disks and other persistent memory. Volatile media may include, for example, dynamic random-access memory (DRAM), which may constitute a main memory. The memory of the controller 32 may also include a solid-state medium, a floppy disk, a flexible disk, hard disk, magnetic tape, another magnetic medium, a CD-ROM, DVD, another optical medium, combinations thereof, and the like.

The controller-executable instruction sets may be transmitted by one or more transmission media, including coaxial cables, copper wire, conductive traces, fiber optics, combinations thereof, and the like. For example, the transmission media may include dedicated connections between two or more components or shared connections (e.g., buses) coupling multiple components together. The signals from or representing controller-executable instruction sets may be transmitted in parallel, serially, or combinations thereof.

The processor 34 may be a custom-made or commercially available processor, a central processing unit (CPU), a graphics processing unit (GPU), an auxiliary processor among several processors associated with the controller 32, a semiconductor-based microprocessor (in the form of a microchip or chip set), a macroprocessor, a combination thereof, or generally a device for executing instructions.

The computer-readable storage medium 36 may include volatile and nonvolatile storage in read-only memory (ROM), random-access memory (RAM), and keep-alive memory (KAM), for example. KAM is a persistent or non-volatile memory that may be used to store various operating variables while the processor 34 is powered down. The computer-readable storage medium 36 may be implemented using a number of suitable memory devices such as programmable read-only memory (PROM), electrically PROM (EPROM), electrically erasable PROM (EEPROM), flash memory, or other electric, magnetic, optical, or combination memory devices capable of storing data, some of which represent executable instructions, used by the controller 32 in controlling the vehicle 10.

The executable instructions may include one or more separate programs, each of which comprises an ordered listing of executable instructions for implementing logical functions. The executable instructions, when executed by the processor 34, receive and process signals from the sensor system 17, perform logic, calculations, methods and/or algorithms for automatically controlling the components of the vehicle 10, and generate control signals to the actuator system 18 to automatically control the components of the vehicle 10 based on the logic, calculations, methods, and/or algorithms. Although a single controller 32 is shown in FIG. 1, embodiments of the vehicle 10 may include more than one controller 32 which communicate over a suitable communication medium or a combination of communication media and that cooperate to route and/or process sensor signals, to perform logic, calculations, methods, and/or algorithms, and to generate control signals that automatically control features of the vehicle 10. In some aspects, one or more executable instructions of the controller 32 are embodied in the vehicle-control system 13.

The vehicle 10 may be an autonomous vehicle with the vehicle-control system 13 incorporated either partially or entirely therein. The vehicle-control system 13 may be simply referred to as the system. The vehicle 10 may be, for example, a vehicle that is automatically controlled to carry passengers from one location to another. In some aspects, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under various roadway and environmental conditions that can be managed by a human operator.

The sensor system 17 includes one or more sensors 17a, 17b, 17n (i.e., sensing devices) that sense observable conditions of the exterior and/or the interior of the vehicle 10. The sensors 17a, 17b, 17n are in communication with the controller 32 and may include, but are not limited to, one or more accelerometers (e.g., gyroscopes), one or more radio detection and ranging (RADAR) devices, one or more light detection and ranging (LIDAR) devices, one or more global positioning system (GPS) devices, one or more image capture devices 17a (e.g., optical cameras and/or thermal cameras), ultrasonic devices, one or more inertial measurement units 17b, speed sensing devices, pressure sensing devices, temperature sensing devices 17n, humidity sensing devices, voltage sensing devices, current sensing devices, resistance sensing devices, airflow sensing devices, gas sensing devices, actuation sensing devices, and/or other sensing devices.

The communication network 19 is configured to communicate information to and from vehicle components and/or other entities 91. The information may be communicated through wireless connections, wired connections, or combinations thereof. The communication system 19 may include an internal-communication management module 92, an external-communication management module 93, and a bus 94.

The bus 94 is configured to carry signals and/or data between various components of the vehicle 10. In some aspects, the bus 94 is a controller area network (CAN) bus 94. The internal-communication management module 92 is configured to manage and/or coordinate signaling between vehicle components via the bus 94.

The external-communication management module 93 is configured to manage and/or coordinate signaling between the vehicle 10 or components thereof and other entities 91. The other entities 91 may be, for example, other vehicles ("V2V" communication), infrastructure ("V2I" communication), remote systems (e.g., internet-based communication), and/or personal devices (e.g., a cellular telephone). In some aspects, external-communication management module 93 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 19 may include one or more antennas and/or transceivers for receiving and/or transmitting signals, such as cooperative sensing messages (CSMs).

In some aspects, the external-communication management module 93 is directly connected to the bus 94, while in some further aspects, the external communication management module 93 is coupled to the bus 94 via, for example, the internal-communication management module 92.

Figure 2:
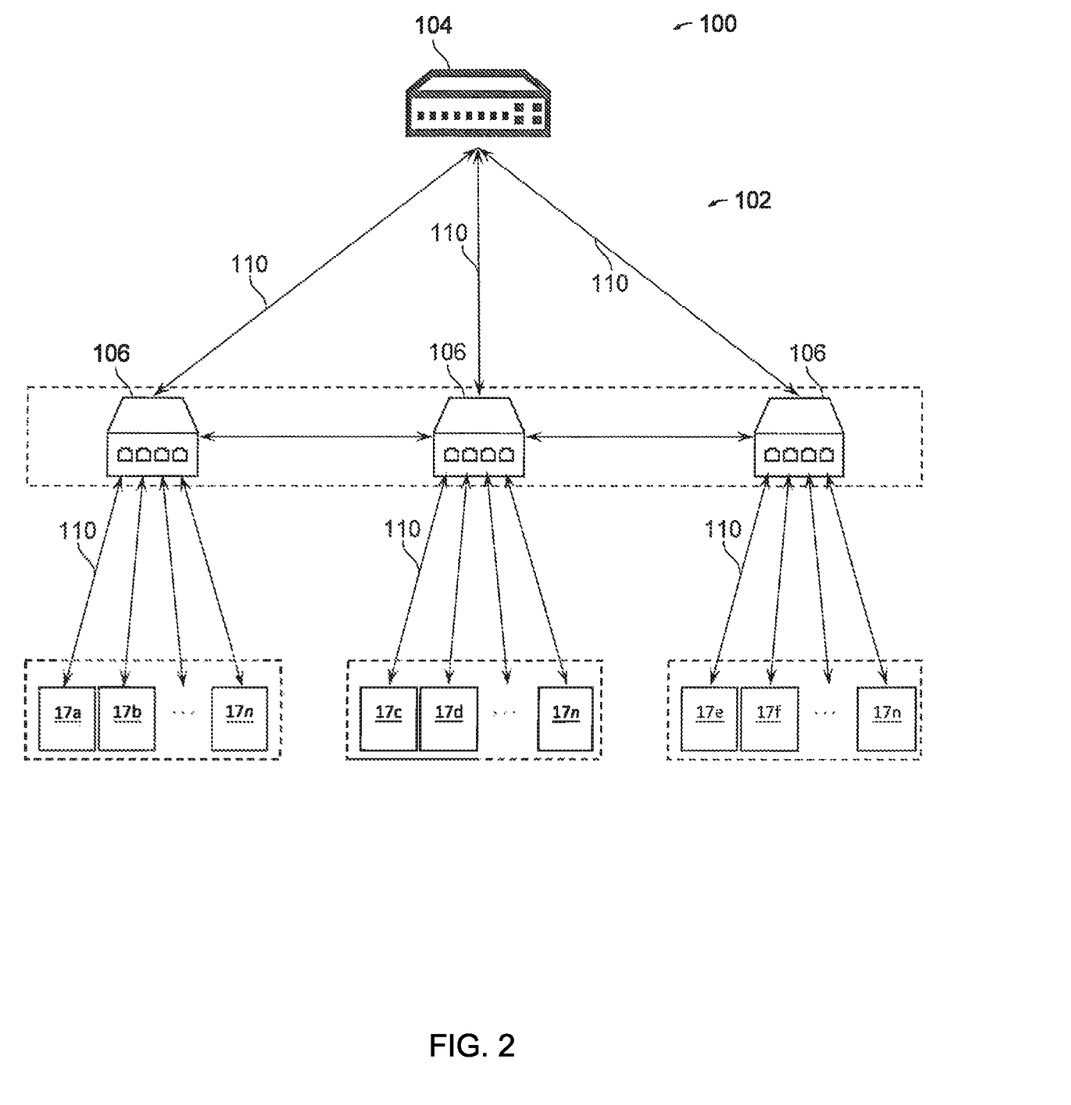
FIG. 2 is a schematic topology of a portion of the communication network, in accordance with aspects of the present disclosure.

FIG. 2 illustrates a schematic topology of a portion 100 of the communication network 19. The illustrated portion 100 depicts a switch cascade 102, including a central switch 104, a plurality of edge switches 106, and the plurality of sensors 17a to 17n. Each of the switches 102, 104 is configured to provide low latency forwarding and/or routing of data between connected devices. Moreover, the switches are also configured to buffer and frame queue data for transmission over the communication network 19 along one or more of the data paths 110.

The data paths 110 are independent routes for transmission of data through the network topology 100 and may be multimodal. For example, one leg of a data path 110 may be wired while another is wireless. Further, while the data paths 110 are illustrated as one-to-one connections in the illustrated figures, it is contemplated that one or more of the data paths 110 may be implemented as shared connections. For example, the data paths 110 may include the CAN bus 94 or automotive ethernet communication bus.

The sensors 17a to 17n are configured to detect one or more physical characteristics. The detected characteristics are encoded for transmission via the communication network 19 for storage and/or processing. While the illustrated topology 100 includes only sensors 17a to 17n at the network edge switches, it is contemplated that other devices may be coupled or connected to one or more of the edge switches 106.

Figure 3:
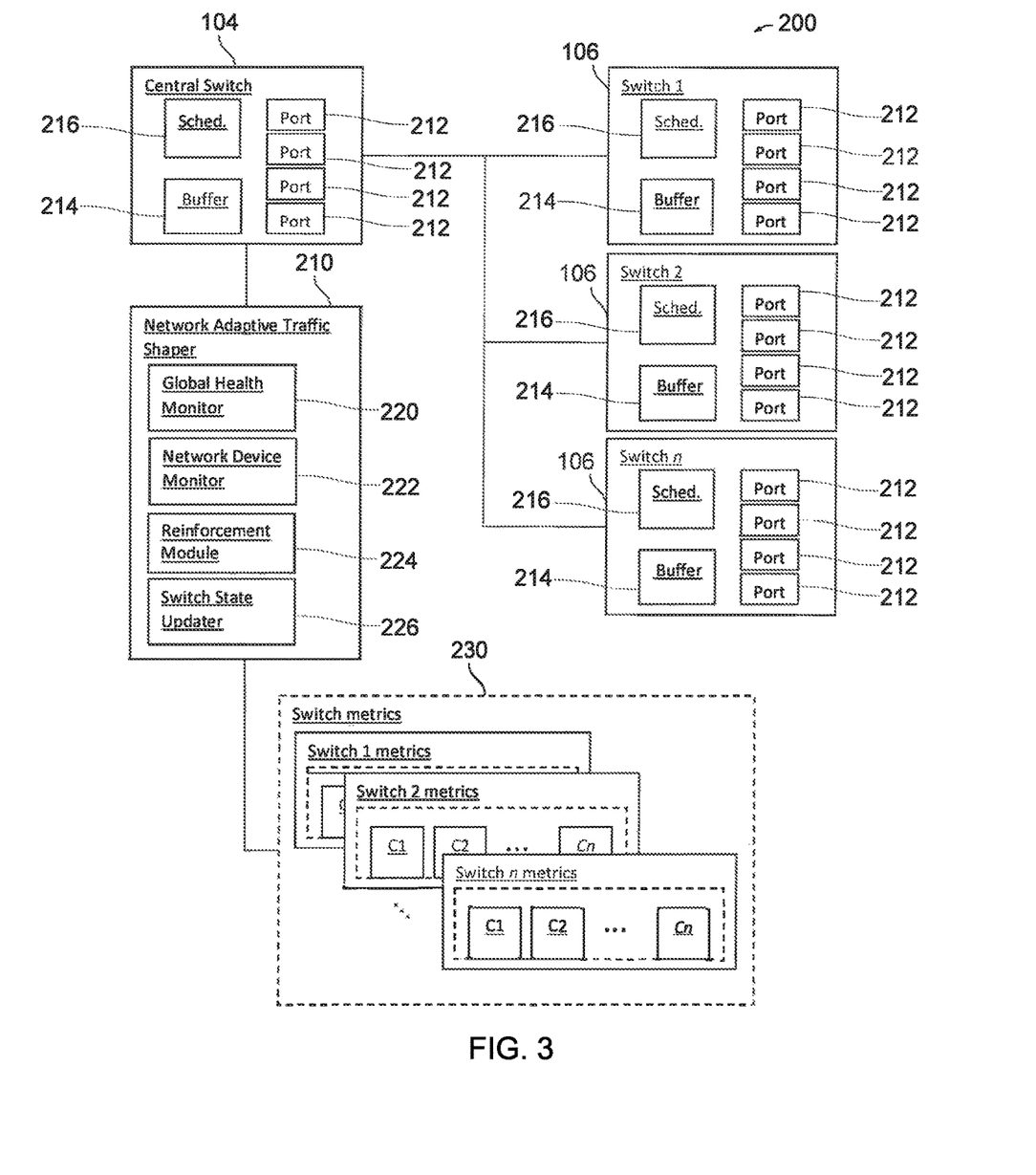
FIG. 3 is a schematic block diagram of a portion of the communication network, in accordance with aspects of the present disclosure.

FIG. 3 illustrates a schematic block diagram of a portion 200 of the communication network 19. The illustrated portion 200 includes the central switch 104, the plurality of edge switches 106, and a network adaptive traffic shaper 210.

Each switch 104, 106 includes a plurality of ports 212, a buffer 214, and a scheduler 216. Each port 212 provides for a communication connection with respective connected devices. The buffer 214 is configured to store received data for retransmission at predetermined times. The scheduler 216 is configured to manage data packet streams passing through the switch 104, 106. The scheduler 216 may modify or reorder the data packet stream to optimize communication network 19 performance and/or conformity with desired traffic metrics or requirements. For example, the scheduler 216 may drop, delay, or prioritize data packets for retransmission based on one or more criteria or network requirements.

Each switch 104, 106 includes a set of qualities or states that may be altered to impact performance. The switch qualities or states may include, for example, gate timing, queue length, priority queues, and packet routing. The gate timing and/or available slots for retransmission may be changed if, for example, an incoming data packet is being dropped because it cannot be buffered or a received data packet is being dropped because it cannot be retransmitted by the switch 104, 106. The queue length may be increased for a data packet class and/or decreased for one or more other data packet classes if the data packet class is being excessively dropped. The number of priority queues may be altered to manage the bandwidth available for the individual queues by, for example, decreasing the number of available priority queues so that each remaining queue has more bandwidth available.

Data packet routes may be altered if, for example, a desired data path becomes too congested with traffic such that higher-priority data packet classes continue to be retransmitted onto the congested data path while lower-priority data packet classes are retransmitted to another switch 104, 106 within the network topology 200. Once received by that switch, the data packet may be held, retransmitted toward the destination device, or sent to yet another switch within, for example, the ring topology.

The switch 104, 106 may include a plurality of operational modes. Each operational mode may include a set of predetermined quality values or states, a set of well-defined relationships between quality values or states based on a known or measurable features, combinations thereof, and the like. Beneficially, the plurality of operational modes may be selected to reduce the configuration space available for the switch 104, 106 and network 19 to optimize network requirements.

Each operational mode is configured to provide a desired behavior of the switch and network traffic. In some aspects, the operational modes may include a high-traffic mode, an advanced driver assistance system ("ADAS") mode, and an over-the-air ("OTA") mode. The high-traffic mode may be configured to shape network traffic based at least in part on a class of the data packets. The ADAS mode may be configured to shape network traffic based at least in part on data packets originating from a subset of the sensors and/or packets bound for a subset of connected devices. The OTA mode may be configured to shape network traffic based at least in part on a data packet density or concentration.

The switch 104, 106 may change its operational mode or quality in response to receiving a control signal (such as a value, flag, or instruction) received from a managing device (i.e., network adaptive traffic shaper 210, as described below), detecting predetermined properties of the received data, determining a status of the data and buffer of the switch, combinations thereof, and the like.

The central switch 104 is coupled to each of the plurality of edge switches 106. In some aspects, the central switch 104 is further configured to manage aspects of the edge switches 106. For example, the central switch 104 may supplement or wholly control setting the operational modes of the edge switches 106.

Each edge switch 106 is disposed between the central switch 104 and one or more connected sensors 17. Each edge switch 106 may also be connected to one or more of the other edge switches 106 in a suitable configuration, such as a ring topology. The edge switches 106 are configured to receive data packets from respective connected sensors 17 and retransmit the received data packets to at least one connected switch 104, 106 or other device using one or more of the data paths 110.

The network adaptive traffic shaper 210 is configured to monitor and manage aspects of the network 19 and optimize network traffic (i.e. traffic shaping) within the network 19 to meet changing needs or requirements of the communication network 19 over time. The network adaptive traffic shaper 210 includes a global health monitor 220, a network device monitor 222, a switch state monitor 224, and a switch state updater 226.

The global health monitor 220 is configured to monitor conditions of the network and compliance with network requirements based on a plurality of switch metrics 230.

Each of the plurality of switch metrics 230 (i.e., switch/metrics to switch n metrics) includes information related to data package classes for that respective switch 104, 106. The information includes suitable metrics to determine whether the network requirements are being met. In some aspects, the information provides measurements of jitter, latency, and dropped packets for each data packet class C1 to Cn.

The switch metrics 230 may be obtained from each switch 104, 106, obtained from other devices in the network 19, or determined by the health monitor 220.

The network device monitor 222 is configured to monitor information related to devices that are connected to the network 19. The information may include network topology and/or device identities, locations, operational states, configurations, etc. For example, the network device monitor 222 may obtain operational information for each switch 104, 106 within the communication network 19 including, for example, available switch operational modes, employed operational modes, settings of individual switch qualities or states, flags, errors, and associated times The switch state module 224 is configured to correlate effects that changes to settings of the communication network 19 have on network performance given known vehicle operating conditions and provide instructions to change one or more switch states to the switch state updater 226.

The switch state module 224 includes a suitable reinforcement learning (RL) algorithm, such as a state-action-reward-state-action model. In some aspects, inputs to the learning model include the set of operational modes for each switch 104, 106, the switch metrics 230, and the system requirements. Beneficially, this small set of well-defined inputs reduces resources required to operate the reinforcement or switch state module.

Additionally, or alternatively, the inputs may include the switch qualities or states for each of the switches 104, 106. Beneficially, this granularity provides robust control over network traffic shaping to optimize handling of a larger set of environmental occurrences.

The switch state updater 226 is configured to receive instructions for actions from the switch state module 224 and send control signals to the switches 104, 106 to effect the actions, such as transitioning the switch from a first operational mode to a second operational mode thereby adjusting or changing the switch states or qualities.

While the illustrated network adaptive traffic shaper 110 is depicted as a stand-alone block, it is contemplated that the network adaptive traffic shaper or components thereof may be implemented on the central switch 106 or other suitable devices.

Figure 4:
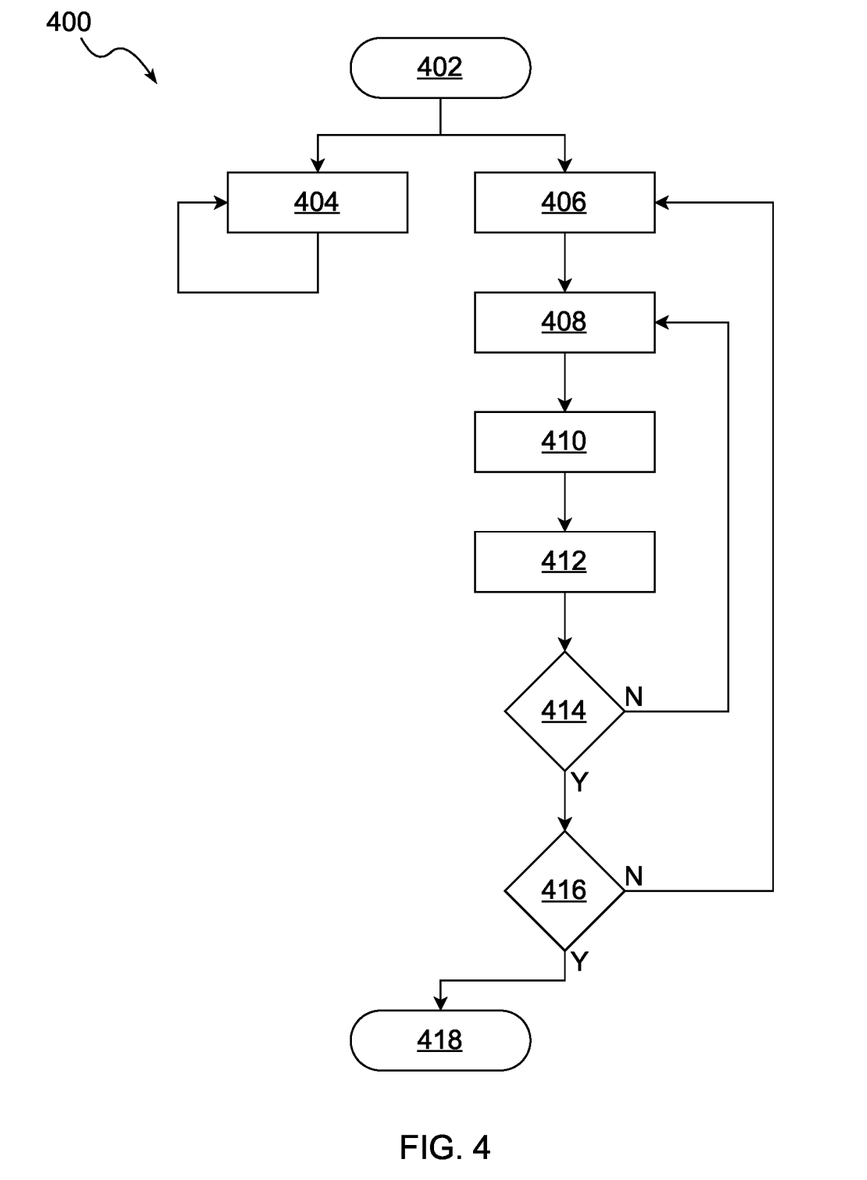
FIG. 4 is a flowchart of a method for training the RL algorithm in a pre-production environment, in accordance with aspects of the present disclosure.

Referring now to FIG. 4, a flowchart of a method 400 for training the RL algorithm in a pre-production environment is provided. It should be understood that to train the RL algorithm, a computer system other than the vehicle 12 and the controller 32 may be used, including, for example, a server computer, a cloud-based server farm, or the like. Once the RL algorithm has been trained, the RL algorithm is transferred to the controller 32 of the vehicle 12 such that the RL algorithm may be retrieved by the controller 32 of the vehicle 12 by the network adaptive traffic shaper 210 to effect changes to network performance.

Moreover, the RL algorithm provides an RL agent that may take actions in the environment (i.e., the communication network 19). The RL algorithm takes into account a variety of factors such as packet priority, dropped packets, latency, jitter, throughput and other network traffic parameters. The set of possible actions which the switch state module 224 may take is known as the action space. The action space may include, for example, changing: gate timing, queue length, routing information, priority queue, and the like. As will be discussed in further detail below, for each action taken, the RL agent receives an appropriate reward. Based on the observation space, the actions taken within the action space, and the computed rewards, the RL algorithm is trained to maximize the received reward. It should be understood that various additional training methods, such as, for example, supervised learning, semi-supervised learning, and unsupervised learning, are within the scope of the present disclosure. Furthermore, RL algorithms using a policy function instead of a machine learning model are also within the scope of the present disclosure.

The method 400 begins at block 402 and proceeds to blocks 404 and 406. At block 404, traffic metrics are determined for each of the plurality of changes in the states of switches 104, 106 in the environment. This is repeated constantly, such that the traffic metrics for each of the plurality of changes in the switch states is constantly updated to account for changes in the network traffic.

At block 406, a unique environment is generated. The environment includes the ECUs, main and edge switches, communication network and a plurality of changes in the switch states. In an exemplary embodiment, the environment further includes a plurality of traffic metrics, each of the plurality of traffic metrics exhibiting differing traffic parameters. In an exemplary embodiment, a plurality of network parameters of the network traffic in the environment is altered such as the operation mode. After block 406, the method 400 proceeds to block 408.

At block 408, network adaptive traffic shaper 210 takes an action within the action space. In a non-limiting example, the action space includes changing the states of the switches: gate timing, queue length, routing information, priority queue, and the like. In an exemplary embodiment, the action is determined by the RL algorithm based on the traffic metrics for each of the plurality of switch states and the variety of additional factors such as traffic requirements. After block 408, the method 400 proceeds to block 410.

At block 410, a total reward is calculated based on the actions taken at block 408. In an exemplary embodiment, total reward is calculated based on other factors (e.g., packet priority, dropped packets, latency, jitter, throughput, and the like) such that the traffic shaping algorithm is trained to effectively address a variety of network traffic environments. For example, a large negative reward is provided if the action taken, at block 408, results in the data packets not meeting requirements. It should be understood that the first and second rewards are computed for the purpose of training the RL algorithm to handle data packets not meeting network requirements. Additional rewards may be included in the total reward for the purpose of training the RL algorithm to effectively address a variety of network traffic environments or modes. After block 410, the method 400 proceeds to block 412.

At block 412, to train the RL algorithm, a decision-making function of the RL algorithm is updated based on the reward calculated. In an exemplary embodiment, parameters of the traffic shaping algorithm (e.g., switch states and/or the like) are modified based on the reward calculated at block 410 such that the RL algorithm learns to maximize the total reward. In an exemplary embodiment where the RL algorithm uses a policy function, an RL policy function is updated. After block 412, the method 400 proceeds to block 414.

At block 414, a predetermined stopping point is evaluated. In an exemplary embodiment, the predetermined stopping point is evaluated based on at least one of a plurality of factors, including, for example, an average total reward collected over time and a convergence of the RL agent. If the predetermined stopping point is reached, the method 400 proceeds to block 416. If the predetermined stopping point is not reached, the method 400 returns to block 408, such that a further action is taken, and the decision-making function of the RL algorithm is further updated.

At block 416, a predetermined training stopping point is evaluated. In an exemplary embodiment, the predetermined training stopping point is evaluated based on at least one of a plurality of factors, including, for example, a number of iterations performed, and a convergence of a total reward received during each iteration. If the predetermined training stopping point is reached, the method 400 proceeds to enter a standby state, at block 418. If the predetermined stopping point is not reached, the method 400 returns to block 404, such that a new, unique environment is generated.

The preceding detailed description is merely exemplary in nature and is not intended to limit the application and uses. Furthermore, there is no intention to be bound by expressed or implied theory presented in the preceding sections or the preceding detailed description.

As used herein, the term "module" refers to hardware, software, firmware, electronic control component, processing logic, and/or processor device, individually or in a combination thereof, including without limitation: an application specific integrated circuit (ASIC), an electronic circuit, a processor (shared, dedicated, or group) and memory that executes one or more software or firmware programs, a combinational logic circuit, and/or other components that provide the described functionality.

Embodiments of the present disclosure may be described herein in terms of functional and/or logical block components and various processing steps. It should be appreciated that such block components may be realized by one or more hardware, software, and/or firmware components configured to perform the specified functions. For example, embodiments of the present disclosure may employ various integrated circuit components (e.g., memory elements, digital signal processing elements, logic elements, look-up tables, or the like), which may carry out a variety of functions under the control of one or more microprocessors or other control devices. In addition, those skilled in the art will appreciate that embodiments of the present disclosure may be practiced in conjunction with one or more systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail. Furthermore, the connecting lines shown in the various figures are intended to represent example functional relationships and/or physical couplings between the various elements. It should be noted that alternative or additional functional relationships or physical connections may be present in embodiments of the present disclosure.

As understood by one of skill in the art, the present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover modifications, equivalents, combinations, sub-combinations, permutations, groupings, and alternatives falling within the scope and spirit of the disclosure and as defined by the appended claims. For example, the present disclosure is not restricted to automotive applications, in fact, one of ordinary skill in the art will appreciate that the teachings disclosed herein may be applied to applications other than automotive.

As used herein, unless the context clearly dictates otherwise: the words "and" and "or" shall be both conjunctive and disjunctive, unless the context clearly dictates otherwise; the word "all" means "any and all" the word "any" means "any and all"; the word "including" means "including without limitation"; and the singular forms "a", "an", and "the" includes the plural referents and vice versa.

Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

Words of approximation, such as "approximately," "about," "substantially," and the like, may be used herein in the sense of "at, near, or nearly at," "within 0-10% of," or "within acceptable manufacturing tolerances," or a logical combination thereof, for example.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle comprising:
a communication data network for transmitting a plurality of data, wherein the data includes a plurality of data packets;
a plurality of electronic control units (ECUs), wherein each of the plurality of ECUs are in communication with the communication data network for transmitting the plurality of data packets to and receiving the plurality of data packets from the communication data network;
a plurality of sensors in electrical communication with the ECU s each providing a sensor signal to the ECUs; and
a network device in communication with the communication data network for controlling the plurality of data packets on the communication data network, wherein the network device is configured to execute program code to carry out the following operations:
monitor a plurality of data traffic metrics of the plurality of data packets on the communication data network;
compare the plurality of data traffic metrics to a plurality of data network requirements;
determine whether the plurality of data traffic metrics is different than the plurality of data network requirements; and
adjust a data traffic shaper based on the determination that the plurality of traffic metrics is different than the plurality of data network requirements,
wherein the network device is a network switch having a plurality of states that are adjustable by the data traffic shaper to control the data traffic on the communication data network, and the network switch has a plurality of operational modes that are selected by the data traffic shaper, the plurality of operational modes including:

a high-traffic mode defined by a class of the data packets;

an advanced driver assistance (ADAS) mode defined by data packets originating from the plurality of sensors and data packets bound for connected devices connected to the communication data network; and an over-the-air (OTA) mode defined by a data packet density or concentration.

2. The vehicle of claim 1, wherein the data traffic shaper includes:

a global health monitor;

a network device monitor;

a switch state monitor; and a switch state updater.

3. The vehicle of claim 2, wherein the global health monitor is configured to monitor conditions of the communication data network and compliance with communication data network requirements based on a plurality of switch metrics that include information related to data package classes, the information including suitable metrics to determine whether the data communication network requirements are being met by providing measurements of jitter, latency, and dropped packets for each data packet class.

4. The vehicle of claim 3, wherein the network device monitor is configured to monitor information related to the connected devices that are connected to the communication data network, the information including network topology, device identities, device locations, device operational states, and device configurations.

5. The vehicle of claim 4, wherein the switch state monitor is configured to correlate effects that changes to settings of the communication data network have on network performance given known vehicle operating conditions and provide instructions to change one or more switch states to the switch state updater.

6. The vehicle of claim 5, wherein the switch state updater includes a reinforcement learning (RL) algorithm, and the RL algorithm includes a state-action-reward-state-action model.

7. The vehicle of claim 1, wherein the plurality of states of the network switch that are adjusted by the data traffic shaper include gate timing, queue length, priority queues, and packet routing.

8. A method for controlling data packets in a vehicle, the method comprising:

transmitting a plurality of data on a communication data network, wherein the plurality of data includes a plurality of data packets; and controlling the plurality of data packets travelling on the communication data network using a network device in communication with the communication data network, wherein the network device has a plurality of states and is configured to execute program code to carry out the following operations:

monitor a plurality of data traffic metrics of the plurality of data packets travelling on the communication data network;

compare the plurality of data traffic metrics to a plurality of data network requirements;

determine whether the plurality of data traffic metrics is different than the plurality of data network requirements; and adjust a data traffic shaper based on the determination that the plurality of traffic metrics is different than the plurality of data network requirements, wherein the network device is a network switch having the plurality of states that are adjustable by the data traffic shaper to control the data traffic on the communication data network, and the network switch has a plurality of operational modes that are selected by the data traffic shaper, the plurality of operational modes including:

a high-traffic mode defined by a class of the data packets;

an advanced driver assistance (ADAS) mode defined by data packets originating from the plurality of sensors and data packets bound for connected devices connected to the communication data network; and an over-the-air (OTA) mode defined by a data packet density or concentration, and wherein the plurality of states of the network switch that are adjusted by the data traffic shaper include gate timing, queue length, priority queues, and packet routing.

* * * * *